United States Patent
Inoue

[11] 3,871,766
[45] Mar. 18, 1975

[54] IMAGE EXPOSURE DEVICE
[75] Inventor: Shozo Inoue, Tokyo, Japan
[73] Assignee: Canon Kabushiki Kaisha, Tokyo, Japan
[22] Filed: May 3, 1973
[21] Appl. No.: 356,928

[30] Foreign Application Priority Data
May 6, 1972 Japan................................ 47-52882
June 2, 1973 Japan................................ 48-65640

[52] U.S. Cl............................ 355/66, 355/8, 355/65
[51] Int. Cl. ............................................. G03b 27/16
[58] Field of Search............................. 355/8, 65, 66

[56] References Cited
UNITED STATES PATENTS
| | | | |
|---|---|---|---|
| 3,419,327 | 12/1968 | Oikawa et al............................ | 355/8 |
| 3,512,886 | 5/1970 | Wirley et al. ......................... | 355/8 X |
| 3,528,738 | 9/1970 | Hodges................................ | 355/8 X |
| 3,614,222 | 10/1971 | Post et al................................ | 355/8 |
| 3,689,145 | 9/1972 | Kawakubo et al...................... | 355/8 |
| 3,724,944 | 4/1973 | Sugita.................................. | 355/8 X |
| 3,759,149 | 9/1973 | Mason................................ | 95/4.5 R |

*Primary Examiner*—Samuel S. Matthews
*Assistant Examiner*—E. M. O'Connor
*Attorney, Agent, or Firm*—Fitzpatrick, Cella, Harper & Scinto

[57] ABSTRACT

In an image exposure device for applying the information of a stationary original to a moving photosensitive medium by a movable scanning mirror through a slit, there is provided a plurality of movable mirrors disposed on an endless track to scan the image light from the original only when they are moving in one direction. A projection lens is provided to project therethrough the image light upon the photosensitive medium.

8 Claims, 7 Drawing Figures

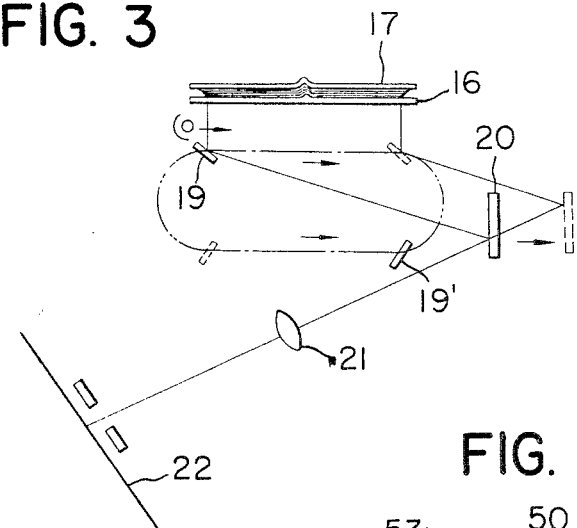
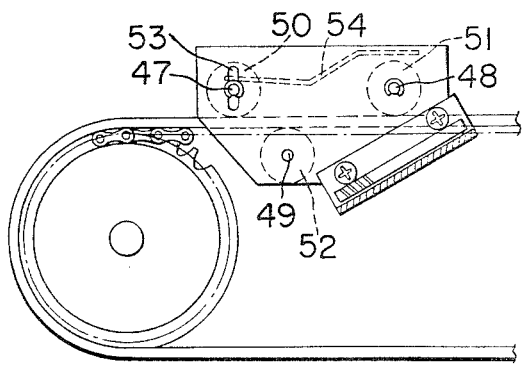
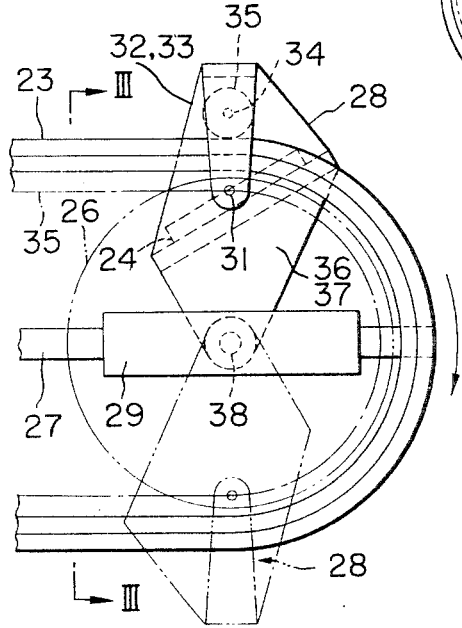

IMAGE EXPOSURE DEVICE

BACKGROUND OF THE INVENTION

1. Field of the Invention

This invention generally relates to an image exposure device, and particularly to an image exposure device of the type which is used with ordinary copiers such as electrophotographic copying machines and the like and in which an original to be copied resting on a stationary supporting table is projected upon a moving photosensitive medium. More particularly, the invention relates to an image exposure device for providing multiple copies of a single original at high speeds.

2. Description of the Prior Art

Electrophotographic copying machines are well known in which a fixedly positioned original is scanned by a movable scanning optical system including a lens and mirror to thereby form a copy image of the original on a moving photosensitive medium. In these machines, only one of the reciprocal strokes of the scanning optical system, i.e. the forward stroke is utilized for the scanning, with a disadvantage that more time is consumed than the effective time actually directed to the copying. Moreover, in addition to the distance of travel actually required for the mirror, i.e. the distance required for the image exposure, it is necessary to provide a sufficient distance to stabilize the movement of the mirror in order to prevent the undesirable possibility that the image of the original is projected at the start of the mirror when the mirror tends to vibrate, and this leads to an unnecessarily long distance of travel for the mirror. This also limits the frequency of copy cycles continuously available per unit time, and thus not only limits the copying speed of the copying machine but also increases the size of the entire machine because of the increased distance of travel for the mirror.

Furthermore, where the optical system, particularly the lens system, is moved at a higher speed to accomplish quick copying, the lens system would be subjected, at the moment when its movement changes from one direction to the other, to a great magnitude of shock which would impart a mechanical stress and thereby make it difficult to provide a number of copies within a short length of time. A highspeed electrophotographic copying machine suited for the production of multiple copies within a short time is known from U.S. Pat. No. 3,221,622, for example. This an electrophotographic copier which is designed for high-speed copying by the use of a relatively simple projection system, whereas it suffers from a disadvantage in that the surface of the original to be copied must be curved instead of being planar, which in turn leads to inconveniences in handling the original.

SUMMARY OF THE INVENTION

It is a primary object of the present invention to provide an image exposure device for use with electrophotographic or other copying machines which is suitable for high-speed copying and which permits ready handling of the original to be copied.

It is another object of the present invention to provide an improved image exposure device in which a plurality of mirrors, instead of a single reciprocable mirror, are provided on an endless track so that when one of these mirrors completes its scanning stroke another mirror enters its scanning stroke.

It is still another object of the present invention to provide an improved image exposure device in which endless rails are provided to move a plurality of mirrors along an endless track so as to effect scanning with the rails as the guide.

It is yet another object of the present invention to provide an improved image exposure device as described hereinafter and shown in the accompanying drawings.

In brief, according to the present invention, there is provided, in an optical system disposed between an original to be copied resting on a fixed flat surface and a movable photosensitive medium to scan the image of the original and project it through a slit onto the moving photosensitive medium, a plurality of mirrors each capable of one scanning stroke so that one of the mirrors completes its scanning stroke, whereupon another mirror enters its scanning stroke. These mirrors are repetitively revolved along an endless track to extremely economize the idling time between successive copy cycles and to eliminate the mechanical shocks which would otherwise occur during the movement of the mirrors to cause blur in the resultant image, thus contributing to the speed-up of the copying.

The invention will become fully apparent from the following detailed description taken in conjunction with the accompanying drawings.

BRIEF DESCRIPTION OF THE DRAWINGS

FIGS. 1 to 3 are schematic illustrations of the optical scanning effected in various embodiments of the image exposure device according to the present invention.

FIGS. 4 to 7 schematically show some specific forms of the mechanism for operating the mirrors to move along an endless track in the embodiments of FIGS. 1 to 3.

DESCRIPTION OF THE PREFERRED EMBODIMENTS

Figure 1:
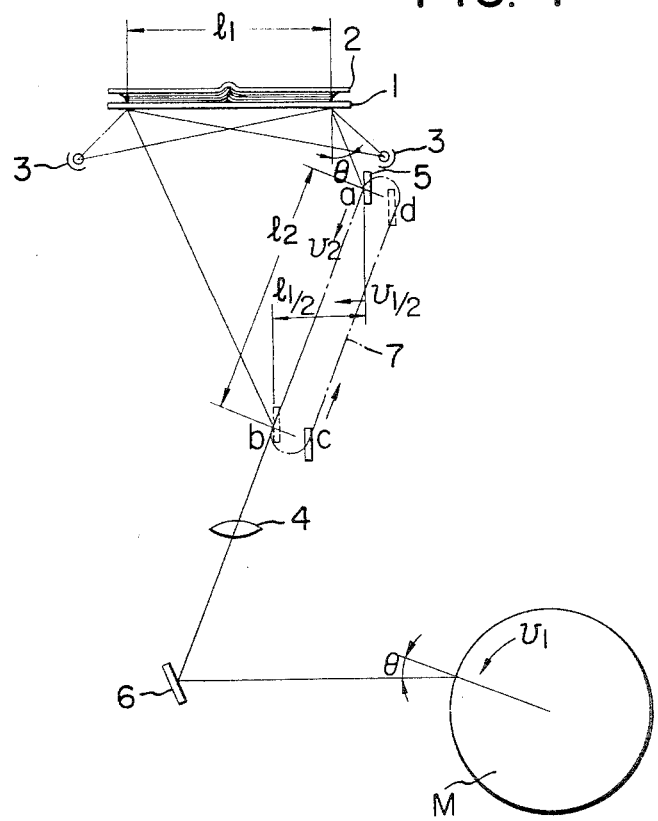

Referring to FIG. 1, numeral 1 designates a stationary table for supporting thereon an original 2 to be copied such as book or the like and an illuminating light source 3 for illuminating the original is provided below the original supporting table 1. The light source 3 may be designed for movement in synchronism with a scanning optical system which will be described hereinafter.

Such optical system may comprise a stationary projection lens 4 immovably mounted with its optical axis being perpendicular to the image-bearing surface of the original, and a movable mirror 5 is disposed with the normal thereto being parallel to the image-bearing surface of the original. The mirror is movable in the direction of the light reflected thereby so as to scan the successive portions of the original so that the movable mirror may receive successive portions of the image from the surface of the original as an emergent light beam of a certain acute angle and then reflect such light, whereafter the reflected light beam may be projected through the stationary lens 4 and via a stationary mirror 6 upon the surface of a photosensitive medium M, thus completing an exposure. The horizontal distance of travel of the movable mirror is selected to one-half of the length $l_1$ of the image-bearing surface and the velocity of the horizontal movement of the same mirror is selected to one-half of the velocity $v_1$ of the photosensitive medium M, whereby the image on the image-bearing surface of the original may be formed on the surface of the photosensitive medium. Moreover, the angle at which the projected image light is incident on the photosensitive medium is made equal to the angle of emergence $\theta$ of the image light from the successive portions of the image-bearing surface of the original. In such optical system, an orbit 7 (indicated by dot-and-dash line) is provided for the movable mirror 5, and two movable mirrors 5 and 5' are installed on this orbit and oriented perpendicularly to the image-bearing surface of the original. Assuming that the distance of travel of each movable mirror 5, 5' is $l_2$, and supposing points $a$, $b$, $c$ and $d$ on the travel path 7 as shown, the orbit is defined so as to satisfy the relations that $\overset{\frown}{ab}=\overset{\frown}{cd}=l_1/2/\sin\theta=l_2$ and $\overset{\frown}{bc}=\overset{\frown}{ad}$. The arcs $\overset{\frown}{bc}$ and $\overset{\frown}{ad}$ are selected to a smallest possible value. With the light source 3 maintained illuminant at all times, the movable mirrors 5 and 5' are moved round along the orbit at a velocity of $v_1/2/\sin\theta$ while the photosensitive medium is rotated always at the velocity of $v_1$, thus enabling high-speed copying to be accomplished.

The copying speed provided according to the present invention will now be compared with that provided by a conventional optical system employing a reciprocable mirror. If $l_1 = 210$ mm (width of format A), $v_1 = 400$ mm/sec. and $\theta = 30°$, then $l_2 = 210/2 \times 1/\sin 30° = 210$ mm and $v_2 = 400/2 \times 1/\sin 30° = 400$ mm/sec. Thus, the time $t_1$ required in the conventional system for a first copy to be obtained before a second copy cycle starts will be given as $t_1 = 210 \times 2 \times 1/400 \approx 1$ sec., whereas the corresponding time $t_2$ required in the present invention where $\overset{\frown}{bc}=\overset{\frown}{cd}$ will be given as $t_2 = 210+60/400 = 0.675$ sec. If the number of copies continuously produced per minute are $S_1$ and $S_2$ for the conventional system and the inventive system, respectively, $S_1$ will equal $60/1 = 60$ (sheets) and $S_2$ will equal $60/0.675 = 89$ (sheets). This apparently shows that the present invention contributes to the speed-up of the copying.

Also, with the conventional optical system in which the movable mirror 5 is reciprocated, the mirror when starting each of its reciprocal strokes will experience such a great mechanical shock that would result in a remarkable blur of the resultant copy image. To prevent this, the distance of travel of the mirror must be greatly increased and this necessarily means a slow-down of the copying speed. In contradistinction, the present invention which utilizes a plurality of movable mirrors effecting orbital movement is free of any mechanical shock regardless of the copying speed and contributes to higher copying speeds without the need to increase the distance of travel of the mirrors.

Figure 2:
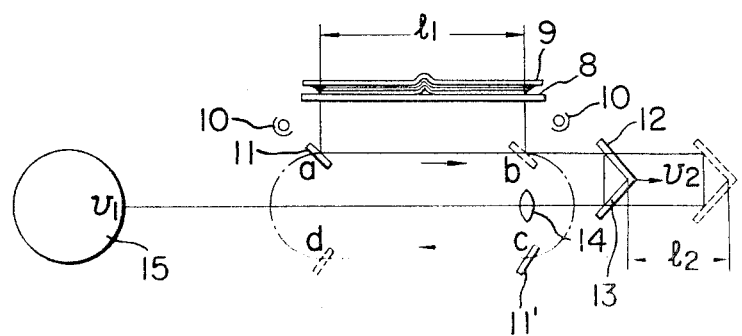

FIG. 2 illustrates another embodiment of the present invention in which a plurality of orbitally movable mirrors according to the present invention has replaced a reciprocally movable mirror in an optical system of the different type from that of FIG. 1. In the figure, numeral 8 denotes a stationary table for supporting thereon an original to be copied 9, and numeral 10 designates stationary illuminating light sources, which may alternatively be movable. Numeral 11 is a first movalbe mirror which is movable in a plane parallel to the image-bearing surface of the original. Two other mirrors 12 and 13 are provided which are movable in the same direction as the first movable mirror 11 but over one-half of the distance of travel thereof. A stationary projection lens 14 is fixedly disposed with its optical axis being parallel to the image-bearing surface of the origi-nal and aligned with the path of the reflected light from the third mirror 13. Numeral 15 designates a movable photosensitive medium.

In the described arrangement, the length of the optical path from the image-bearing surface of the original to the stationary projection lens is maintained constant. Two first movable mirrors 11 and 11' are installed on an endless track in the same manner as the movable mirrors 5 and 5' in the embodiment of FIG. 1. The endless track is such that $\overset{\frown}{ab}=\overset{\frown}{cd}=l_1$, $\overset{\frown}{ad}=\overset{\frown}{bc}=l_2$ and $ab//cd$, and the mirrors 11 and 11' are disposed so as to effect oribital movement while keeping an inclination of 45° with respect to the image-bearing surface of the original during through-the-slit exposure scanning.

FIG. 3 shows a further embodiment of the present invention in which a plurality of orbitally movable mirrors has replaced a single reciprocable mirror in another type of optical system. In this figure, numeral 16 designates a stationary table for supporting thereon an original to be copied 17 and numeral 18 denotes a movable light source. The light source may also be a stationary one as in the embodiment of FIG. 2. Numeral 19 designates a first movable mirror which is movable in a plane parallel to the image-bearing surface of the original. Across the path of the reflected light from the first mirror, there is disposed a second movable mirror 20 which is movable in parallelism to the image-bearing surface of the original at half the velocity of the first movable mirror while receiving the reflected light therefrom. The reflected light from the second movable mirror 20 is projected through a stationary projection lens 21 to form an image on a photosensitive medium 22. With such arrangement, the length of the optical path from the image-bearing surface of the original to the stationary projection lens is maintained constant. A plurality of first movable mirrors 19 (two of them being indicated by 19 and 19' in the shown embodiment) is disposed for movement along an endless track.

While the present invention has specifically been described with respect to three different types of through-the-slit optical system which each employ a plurality of orbitally movable mirrors instead of a single reciprocable mirror, it will be apparent that the invention is also applicable to other types of optical system.

Description will now be made of a mechanism for moving the movable mirrors in the exposure device which has incorporated therein the above-described orbitally movable optical system instead of the reciprocable optical system. In such oribitally movable mirror system, the mirrors must be smoothly moved for scanning and exposure while maintaining a predetermined angle of inclination with respect to the surface of the original to be copied. This will first be described with reference to FIGS. 4 and 5.

Figure 5:
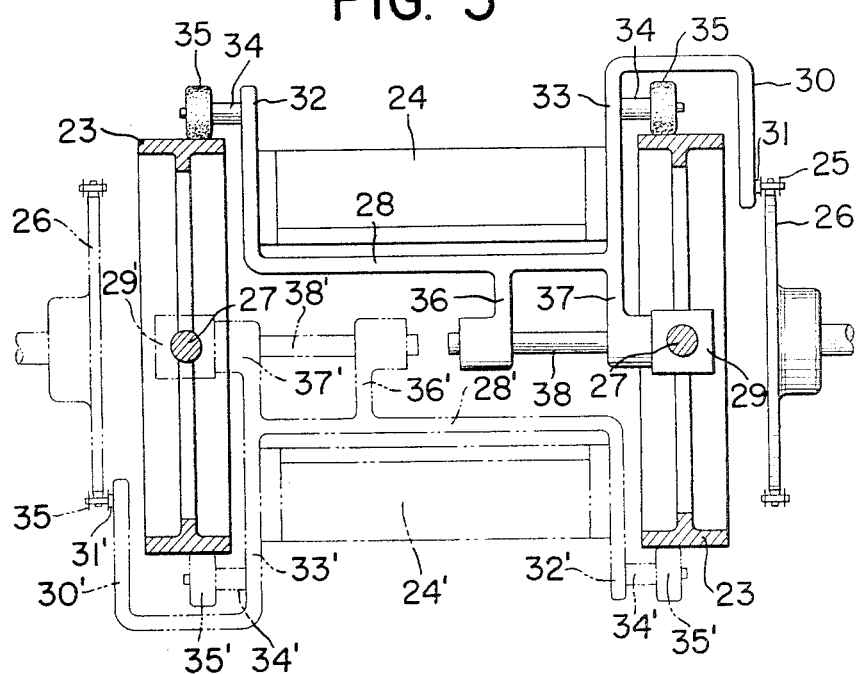

As shown in FIGS. 4 and 5, a pair of endless guides 23 are provided, each of which has, on opposite ends, semi-circular portions and two parallel straight portions connected to the semi-circular portions. Mirrors 24 and 24' are mounted through support members 28 and 28' to move along the endless guides 23. Rotatable sprockets 26 are provided on both ends of the guides 23 coacially with the semi-circular portions and an endless transmission chain 25 is extended between the sprockets 26. Therefore, the chain 25 is movable along the endless guides 23.

A straight rail 27 extends along the major axis of the oval defined by each endless guide 23. Mirror support members 28 and 28' for the mirrors 24 and 24' are positioned between the pair of endless guides and spaced apart from each other by a distance required for exposure. The mirror support members are in turn supported by the guides 23 and rails 27. Slide members 29 and 29' are movably engaged with the respective straight rails 27.

The mirror support members 28 and 28' include arms 30 and 30' having dowels 31 and 31' studded therein and connected to links in the chains 25, and further include arms 32, 33, 32' and 33' having shafts 34 and 34' secured thereto, on which rollers 35 and 35' are rotatably mounted for engagement with the guides 23. The mirror support members further include arms 35 and 35' rotatably mounted on shafts 38 and 38' studded in the slide members 29 and 29'. Thus, a respective mirror support member 28, 28' is mounted only on a respective slide member 29, 29' so as to permit these slide members to reciprocate along the respective rails 27. In the shown arrangement, two such mirror support members may be mounted on the endless guides 23.

As the sprockets 26 are driven to move the chains 25 by an unshown drive source for the copying machine, the mirror support members 28 and 28' are moved along the endless guides 23 and the straight rails 27. Thus, the mirrors 24 and 24' are moved in the direction of arrow along the straight track section T, so that the surface of the stationary original to be copied is projected through the stationary lens and stationary mirror onto the photosensitive drum which is rotating in synchronism with the movable mirrors 24, 24'. More specifically, the mirror 24 is moved from point A to point B contributing to the exposure while the mirror 24' is moved from point C to point D without contributing to the exposure.

When the exposure has been completed with the shafts 38, 38' of the slide members 29, 29' reaching the center of the semi-circle defined by the endless guides, a rotative force is applied to the mirror support arms 36, 37, 36' and 37' while the sliding force hitherto applied to the slide members 29 and 29' is naturally released to stop them. Thus, the mirror support members 28 and 28' revolve 180° about the shafts 38 and 38' with their rollers 35 and 35' rolling along the semi-circular surfaces of the guides 23, so that the mirror 24' shifts to the exposure start position A while the mirror 24 shifts to the point C, whereafter the mirror support member 28 is again moved rectilinearly along the track section T. Thus, the mirror 24' shifts from point A to point B contributing to the exposure while the mirror 24 shifts from point C to point D without contributing to the exposure, whereby the exposure is continuously effected.

In the illustrated embodiment, the endless transmission members have been shown as chains, but belts may be used in lieu of chains.

According to the present invention, as described above, the mirror support members are supported by three different types of members, i.e. endless guides, straight rails and chains, and such supporting system eliminates any inclination of the mirror support members or any nonuniformity in their velocity of movement irrespective of more or less slack present in the chains, thus maintaining a constant angle of inclination of the mirrors with respect to the image-bearing surface of the original and accordingly ensuring smooth scanning for exposure.

Figure 7:
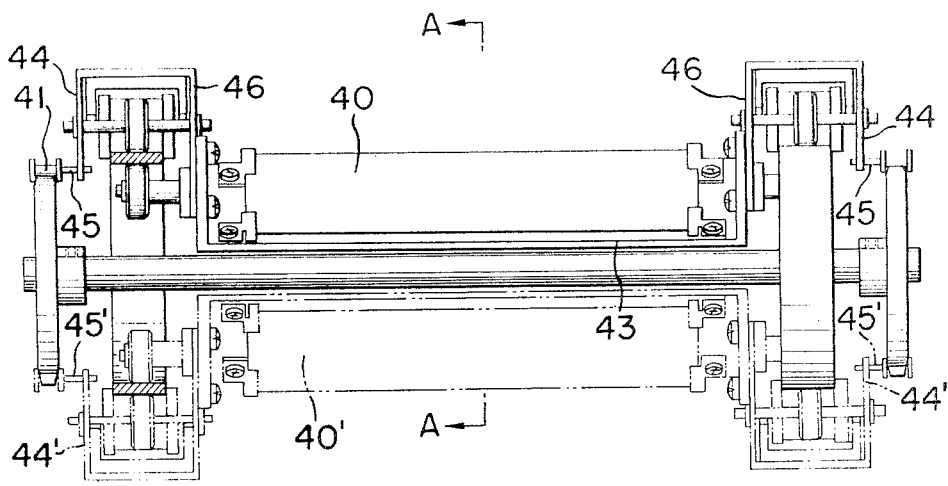

FIGS. 6 and 7 show another form of the mirror moving mechanism. In these figures, a pair of endless guides 39 each having the opposite end portions thereof formed in a semi-circular shape are provided for mirrors 40 and 40' to move round. An endless transmission member such as chain 41 is entrained on each sprocket 42 rotatable about the center of the semi-circle defined by each endless guide 39 so that the chain 41 moves round along the associated guide. Mirror support members 43 and 43' for the mirrors 40 and 40' are positioned between and supported by the pair of endless guides 39 and spaced apart from each other by a distance required for exposure. The mirror support members 43 and 43' include arms 44 and 44' having dowels 45 and 45' studded therein and connected to links in the chains 41, and further include arms 46 and 46'. Shafts 47, 48, 49, 47', 48' and 49' for the arms 44, 44', 46 and 46' have rollers 50, 51, 52, 50', 51' and 52' rotatably mounted thereon for engagement with the guides 39. Thus, the mirror support members are held for stable movement. The rollers 50 and 50' have their shafts freely movable along respective grooves 53 and are urged against the guides by springs 54 so that the rollers can stably move round when they come to the semi-circular portions of the guides.

As the sprockets 42 are driven to move the chains 41 by an unshown drive source for the copying machine, the mirror support members 43 and 43' are moved along the endless guides 39. Thus, the mirrors 40 and 40' are moved in the direction of arrow along the straight track section T, so that the surface of the stationary original to be copied is projected through the stationary lens and stationary mirror onto the photosensitive drum which is rotating in synchronism with the movable mirrors 40, 40'. More specifically, the mirror 40 is moved from point A to point B contributing to the exposure while the mirror 40' is moved from point C to point D without contributing to the exposure.

When the exposure has been completed, the rollers 50, 51, 52, 50', 51' and 52' revolve 180° rolling along the semi-circular surfaces of the guides 39 so that the mirror 40' shifts to the exposure start position A while the mirror 40 shifts to the point C, whereafter the mirror support members 43 and 43' are again moved rectilinearly along the track section T. Thus, the mirror 40' shifts from point A to point B contributing to the exposure while the mirror 40 shifts from point C to point D without contributing to the exposure, whereby the exposure is continuously effected.

Again, in this embodiment, the endless transmission members have been shown as chains, but belts may be used in lieu of chains.

As has been described in detail, the image exposure device of the present invention is successful in providing very high speeds of copying, as well as extremely minimizing the mechanical shocks which were heretofore experienced with conventional reciprocable mirrors, by mounting such mirrors for movement along an endless track. Moreover, the provision of endless guide rails serving as the moving mechanism for these mirrors is useful to ensure stable endless movement of the mirrors without vibrations.

I claim:

1. An image exposure device for applying the information of a stationary original to a moving photosensitive medium by a movable scanning mirror through a slit, comprising:
   means for holding the original at a fixed position;
   means for illuminating the original;
   a plurality of movable mirrors disposed on an endless track to scan the image light from the original only when they are moving in one direction;
   endless guides for guiding said plurality of movable mirrors;
   power transmission members for moving said plurality of movable mirrors along said endless guides;
   mirror support members for engageably supporting said mirrors for movement along said endless guides; and
   connecting members for connecting said mirror support members to said power transmission members.

2. An image exposure device according to claim 1, wherein said power transmission members are endless ones moving round along said endless guides.

3. An image exposure device according to claim 1, wherein said mirror support members include rollers engaged with said endless guides.

4. An image exposure device according to claim 1, wherein said endless guides includes two guides with said movable mirrors interposed therebetween.

5. An image exposure device for applying the information of a stationary original to a moving photosensitive medium by a movable scanning mirror through a slit, comprising:
   means for holding the original at a fixed position;
   means for illuminating the original;
   a plurality of movable mirrors disposed on an endless track to scan the image light from the original only when they are moving in one direction;
   endless guides for guiding said plurality of movable mirrors;
   a straight rail extending along the major axis of each endless guide;
   a slide member engaged with said straight rail;
   a mirror support arm rotatably held by said slide member;
   power transmission members for moving said plurality of movable mirrors along said endless guides;
   mirror support members for engageably supporting said mirrors for movement along said endless guides; and
   connecting members for connecting said mirror support members to said power transmission members.

6. An image exposure device according to claim 5, wherein said power transmission members are endless ones moving round along said endless guides.

7. An image exposure device according to claim 5, wherein said mirror support members include rollers engaged with said endless guides.

8. An image exposure device according to claim 5, wherein said endless guides includes two guides with said movable mirrors interposed therebetween.

* * * * *